United States Patent
Chretien et al.

(10) Patent No.: US 11,515,765 B2
(45) Date of Patent: Nov. 29, 2022

(54) ELECTRIC MOTOR AND METHOD OF USE

(71) Applicant: Regal Beloit America, Inc., Beloit, WI (US)

(72) Inventors: Ludovic Andre Chretien, Columbia City, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 120 days.

(21) Appl. No.: 16/996,591

(22) Filed: Aug. 18, 2020

(65) Prior Publication Data

US 2020/0381982 A1 Dec. 3, 2020

Related U.S. Application Data

(63) Continuation-in-part of application No. 15/408,199, filed on Jan. 17, 2017, now Pat. No. 10,746,450.

(51) Int. Cl.
| | |
|---|---|
| *H02K 11/35* | (2016.01) |
| *H02P 27/06* | (2006.01) |
| *H02K 11/02* | (2016.01) |
| *H02K 11/33* | (2016.01) |
| *F24F 7/007* | (2006.01) |
| *F24F 11/88* | (2018.01) |
| *F24F 11/38* | (2018.01) |

(52) U.S. Cl.
CPC ............. *H02K 11/35* (2016.01); *F24F 7/007* (2013.01); *F24F 11/38* (2018.01); *F24F 11/88* (2018.01); *H02K 11/02* (2013.01); *H02K 11/33* (2016.01); *H02P 27/06* (2013.01)

(58) Field of Classification Search
CPC ........ H02K 11/35; H02K 11/02; H02K 11/33; F24F 7/007; F24F 11/38; F24F 11/88; H02P 27/06
See application file for complete search history.

(56) References Cited

U.S. PATENT DOCUMENTS

| | | | |
|---|---|---|---|
| 6,684,944 B1 * | 2/2004 | Byrnes | F04D 27/00 236/78 D |
| 10,483,898 B1 | 11/2019 | Stauffer et al. | |
| 2003/0154803 A1 * | 8/2003 | Modera | G01F 1/10 73/861.52 |

(Continued)

OTHER PUBLICATIONS

International Search Report and Written Opinion for International Application No. PCT/US2021/046295, dated Nov. 8, 2021, 10 pages.

*Primary Examiner* — Bickey Dhakal
*Assistant Examiner* — Bradley R Brown
(74) *Attorney, Agent, or Firm* — Armstrong Teasdale LLP

(57) ABSTRACT

A motor control assembly for an electric motor. The motor control assembly is configured to be coupled to the electric motor, and includes a wireless communication module, an input power connector, and an inverter module. The wireless communication module is configured to receive a wireless signal from a system controller. The input power connector is configured to receive a DC voltage from an external power supply module. The inverter module is coupled to the wireless communication module and the input power connector. The inverter module is configured to convert the DC voltage to an AC voltage to operate the electric motor according to the wireless signal.

20 Claims, 6 Drawing Sheets

(56) References Cited

U.S. PATENT DOCUMENTS

| | | | |
|---|---|---|---|
| 2010/0163633 A1* | 7/2010 | Barrett | F24F 11/76 |
| | | | 236/51 |
| 2011/0032738 A1* | 2/2011 | Skinner | H02M 1/4208 |
| | | | 363/126 |
| 2014/0070744 A1* | 3/2014 | Becerra | H02P 29/50 |
| | | | 318/400.24 |
| 2014/0079564 A1 | 3/2014 | Becerra et al. | |
| 2015/0326152 A1* | 11/2015 | Becerra | H02M 5/06 |
| | | | 318/400.3 |
| 2016/0365818 A1* | 12/2016 | Shahi | H02P 27/06 |
| 2018/0202698 A1 | 7/2018 | Chretien et al. | |
| 2020/0259446 A1 | 8/2020 | Nardin et al. | |

* cited by examiner

ELECTRIC MOTOR AND METHOD OF USE

CROSS-REFERENCE TO RELATED APPLICATIONS

The present application claims the benefit of and priority to U.S. patent application Ser. No. 15/408,199, filed Jan. 17, 2017, and entitled "ELECTRIC MOTOR AND METHOD OF USE", the disclosure of which is hereby incorporated by reference in its entirety.

BACKGROUND

The field of the invention relates generally to electric motors, and more particularly, to an electric motor having a modular-packaged control system and a method of use.

Electric motors are utilized in various heating, ventilation, and air conditioning (HVAC) appliances (furnaces, heat pumps and air conditioners). For example, an electric motor drives a fan or blower to generate airflow through the appliance. Many known electric motors include a motor control assembly that contains various electronic components for conditioning power for the electric motor, controlling the electric motor, and carrying out communication between the electric motor and other components of the appliance. Typical motor control assemblies are large relative to the electric motor itself, sometimes extending the motor assembly by as much as 50%. Such motor control assemblies can impede the airflow ultimately generated by the fan, which reduces efficiency and increases the cost of operating and maintaining the electric motor.

BRIEF DESCRIPTION

In one aspect, a motor control assembly for an electric motor is provided. The motor control assembly is configured to be coupled to the electric motor, and includes a wireless communication module, an input power connector, and an inverter module. The wireless communication module is configured to receive a wireless signal from a system controller. The input power connector is configured to receive a DC voltage from an external power supply module. The inverter module is coupled to the wireless communication module and the input power connector. The inverter module is configured to convert the DC voltage to an AC voltage to operate the electric motor according to the wireless signal.

In another aspect, a HVAC appliance is provided. The HVAC appliance includes a power supply module, an electric motor, and a motor control assembly. The power supply module is configured to convert an input AC voltage to a DC voltage. The electric motor is configured to turn a fan to generate an airflow through the HVAC appliance. The motor control assembly is coupled to the electric motor. The motor control assembly includes a wireless communication module, an input power connector, and an inverter module. The wireless communication module is configured to receive a wireless signal from a system controller. The input power connector is configured to receive the DC voltage from the power supply module. The inverter module is coupled to the wireless communication module and the input power connector. The inverter module is configured to convert the DC voltage to an AC motor voltage to operate the electric motor according to the wireless signal.

In yet another aspect, a method of operating an electric motor for a HVAC appliance is provided. The method includes converting an input AC voltage to a DC voltage at a power supply module located remotely with respect to the electric motor. The method includes transmitting the DC voltage through an input power connector to an inverter module. The input power connector and the inverter module are disposed on the electric motor. The method includes converting, by the inverter module, the DC voltage to an AC motor voltage. The method includes operating the electric motor using the AC motor voltage.

In yet another aspect, an electric motor control assembly is provided. The electric motor control assembly is configured to be coupled to an electric motor. The electric motor control assembly includes an input power connector configured to receive a direct current (DC) voltage from a power supply module external to the electric motor control assembly, wherein the power supply module includes an electromagnetic interference (EMI) choke, a rectifier, and a capacitor. The electric motor control assembly further includes an inverter module coupled to the input power connector, the inverter module configured to convert the DC voltage to an alternating current (AC) voltage to operate the electric motor according to the control signal. The inverter module is configured to receive the control signal from a system controller via at least one of the input power connector or a wireless communication module coupled to the inverter module and configured for wireless communication with the system controller.

In yet another embodiment, a heating, ventilation, and air conditioning (HVAC) appliance is provided. The HVAC appliance includes a power supply module configured to convert an input alternating current (AC) voltage to a direct current (DC) voltage, an electric motor configured to turn a fan to generate an airflow through the HVAC appliance, and a motor control assembly coupled to the electric motor. The motor control assembly includes an input power connector configured to receive the DC voltage from the power supply module. The motor control assembly further includes an inverter module coupled to the input power. The inverter module is configured to convert the DC voltage to an AC motor voltage to operate the electric motor according to the control signal and further configured to receive the control signal from a system controller via at least one of the input power connector or a wireless communication module coupled to the inverter module and configured for wireless communication with the inverter module.

In yet another embodiment, a method of operating an electric motor for a heating, ventilation, and air conditioning (HVAC) appliance is provided. The method includes converting an input alternating current (AC) voltage to a direct current (DC) voltage at a power supply module located remotely with respect to an electric motor control assembly coupled to the electric motor, wherein the power supply module includes an electromagnetic interference (EMI) choke, a rectifier, and a capacitor. The method further includes transmitting the DC voltage through an input power connector to an inverter module within the electric motor control assembly, the input power connector and the inverter module disposed on the electric motor. The method further includes receiving, by the inverter module, a control signal from a system controller via at least one of the input power connector and a wireless communication module coupled to the inverter module and configured for wireless communication with the system controller. The method further includes converting, by the inverter module, the DC voltage to an AC motor voltage according to the control signal. The method further includes operating the electric motor using the AC motor voltage.

DETAILED DESCRIPTION

Figure 1:
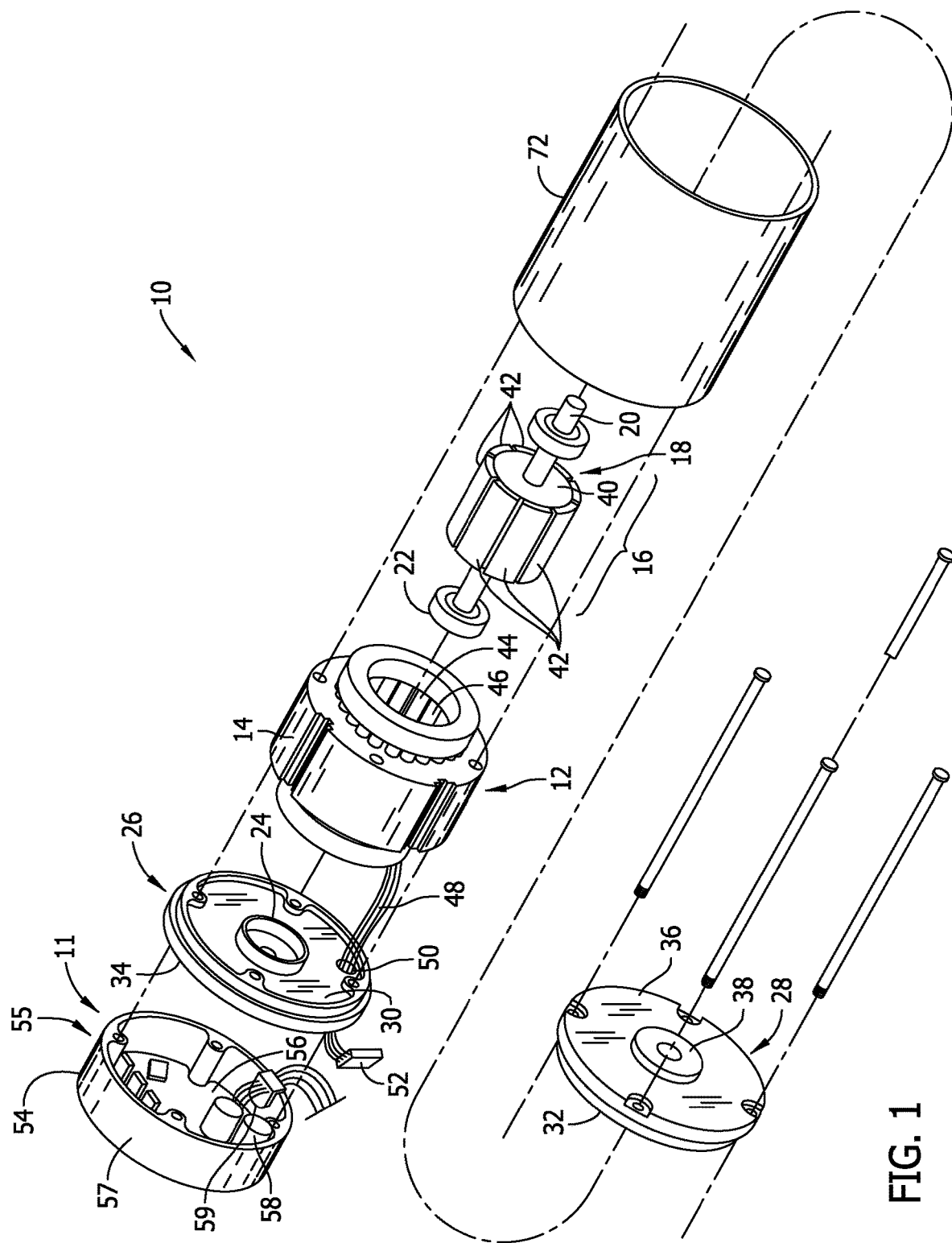
FIG. 1 is an exploded view of an exemplary electric motor.

In the following specification and the claims, a number of terms are referenced that have the following meanings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the electric motors and electric motor control systems described herein provide a modular-packaged control system for HVAC appliances. More specifically, the modular-packaged control system separates the control system into two discrete housings. One housing includes an inverter module and a second housing includes a power supply module that serves as a front-end to the electric motor. The power supply module generally includes passive components with relatively low failure rates. The passive components convert and condition AC power from a power source to DC power to operate the electric motor. The power supply module, in certain embodiments, may be further integrated with a system controller and wireless communication module, e.g., a radio configured for WiFi, Bluetooth, or other suitable wireless communication protocol, for controlling the electric motor remotely. The first housing, which contains the inverter module, includes active components, such as, for example, power switches, one or more processors or digital signal processors (DSPs), and a wireless communication module. The components of the inverter module typically fail at a higher rate than the components of the power supply module. Modular packaging of the inverter module and power supply module enable replacement of the modules separately. The inverter module and its housing are located on the electric motor within a motor control assembly. The power supply module may be located within the HVAC appliance, but remote from the electric motor itself, thus reducing the motor control assembly's impedance of airflow. Moreover, the wireless communication module of the inverter module enables remote control of the inverter module and the electric motor via the wireless communication module of the system controller, and further enables the DC power connections among the power supply module, the motor control assembly, and the inverter module.

FIG. 1 is an exploded view of an exemplary electric motor 10. Motor 10 includes control system 11, a stationary assembly 12 including a stator or core 14, and a rotatable assembly 16 including a rotor 18 and a shaft 20. In the exemplary embodiment, motor 10 is utilized as a fan and/or blower motor in a fluid (e.g., water, air, etc.) moving system. For example, electric motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 10 may be implemented in any application that enables motor 10 to function as described herein. Motor 10 may also be used to drive mechanical components other than a fan and/or blower, including mixers, gears, conveyors, and/or treadmills. In the exemplary embodiment, control system 11 is integrated with motor 10. Alternatively, motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a motor connector 52. While stationary assembly 12 is illustrated for purposes of disclosure, it is contemplated that other stationary assemblies of various other constructions having different shapes and with different number of teeth may be utilized within the scope of the invention.

Motor 10 further includes an electronics enclosure 54 which mounts on the rear portion of motor 10 to house control system 11. Electronics enclosure 54 and control system 11 may sometimes be referred to collectively as a motor control assembly 55. Electronics enclosure 54 includes a bottom wall 56 and a substantially annular side wall 57. Control system 11 includes a plurality of electronic components 58 and a connector 59 mounted within electronics enclosure 54. Control system 11 is connected to winding stages 44 by interconnecting motor connector 52. Control system 11 applies a voltage to one or more of winding stages 44 at a time for commutating winding stages 44 in a preselected sequence to rotate rotatable assembly 16 about an axis of rotation. In an alternative embodiment, control system 11 is remotely positioned from and communicatively coupled to motor 10. In another alternative embodiment, control system 11 is a central control system for more than one electric motor (e.g., in an HVAC system), and is communicatively coupled to motor 10.

A casing 72 is positioned between first end member 26 and second end member 28 to facilitate enclosing and protecting stationary assembly 12 and rotatable assembly 16.

Figure 2:
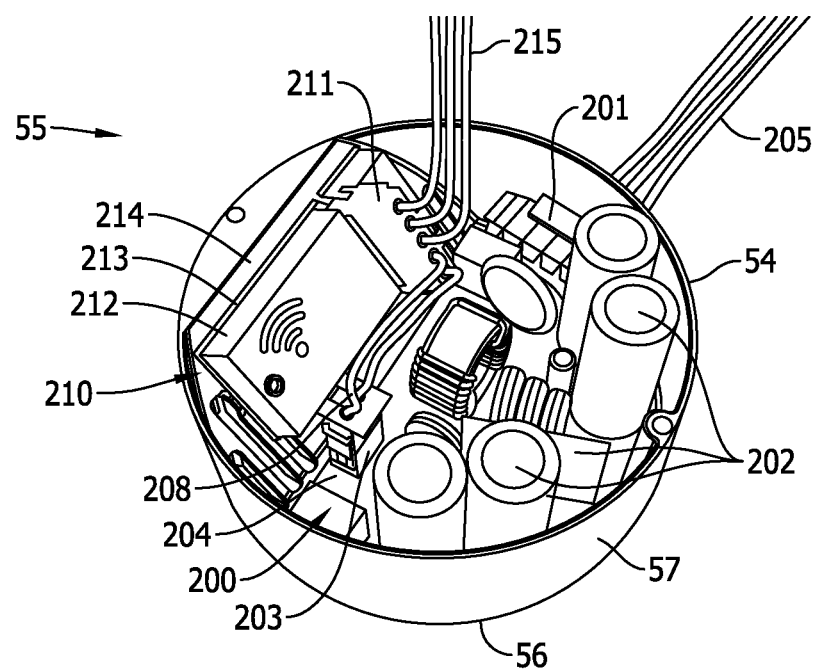
FIG. 2 is a perspective view of the known motor control assembly shown in FIG. 1.
Figure 3:
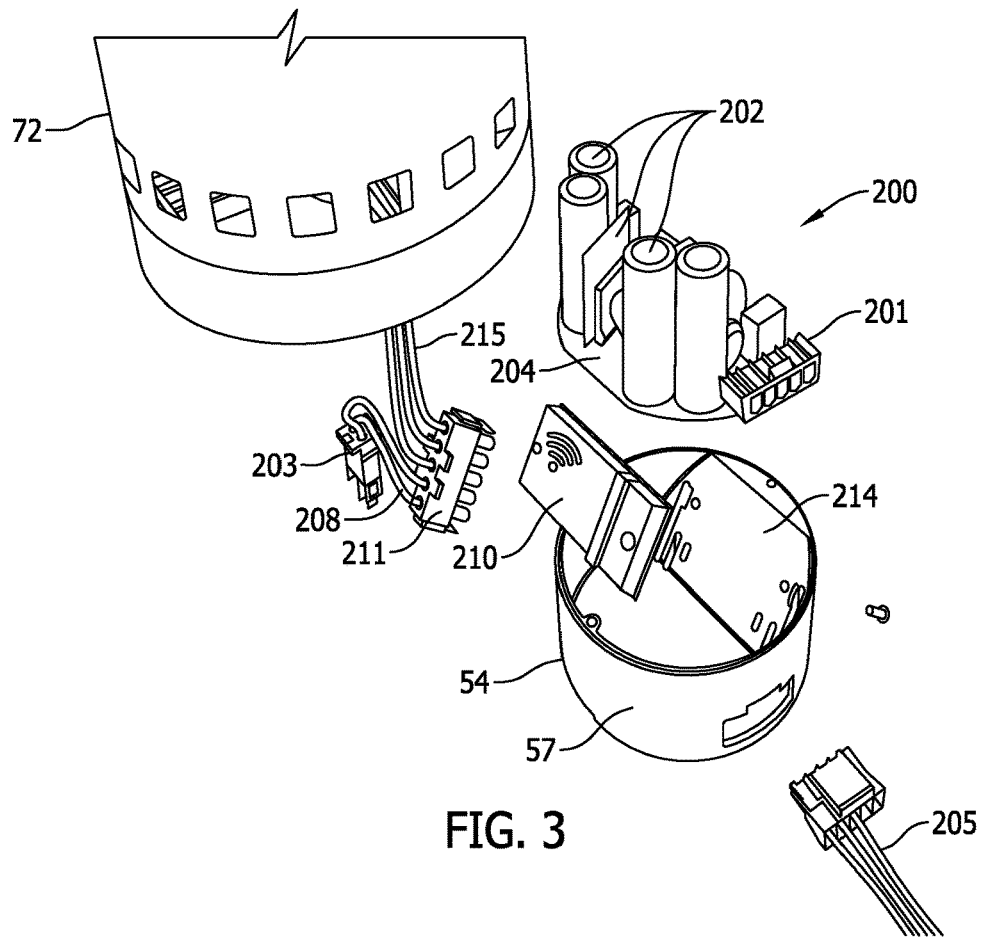
FIG. 3 is an exploded perspective view of the known motor control assembly shown in FIGS. 1 and 2.
Figure 4:
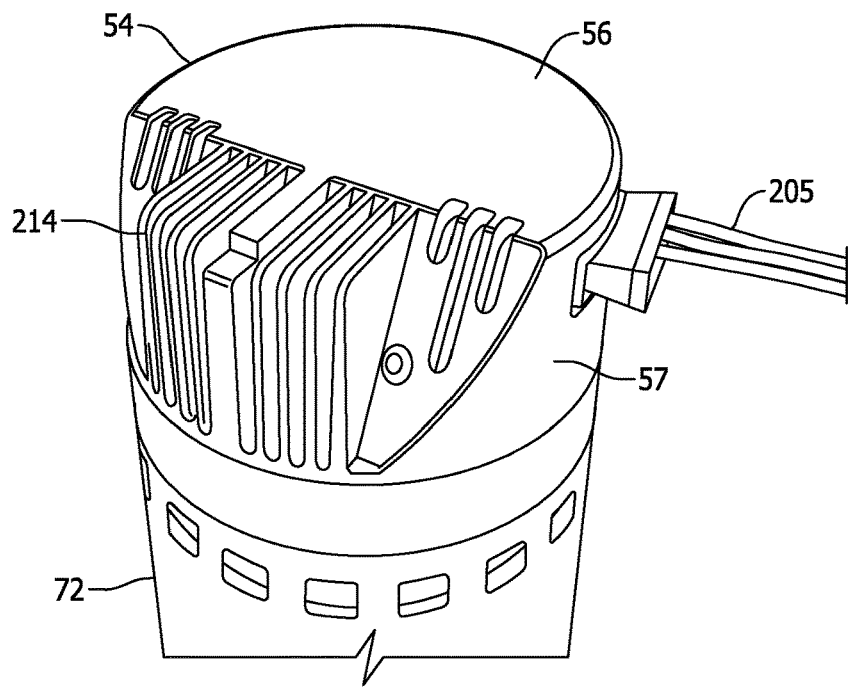
FIG. 4 is an assembled view of the known motor control assembly shown in FIGS. 1-3 coupled to the motor shown in FIG. 1.

FIG. 2 is a perspective view of motor control assembly 55. FIG. 3 is an exploded perspective view of a known motor control assembly 55. FIG. 4 is an assembled view of known motor control assembly 55 coupled to motor 10. In the exemplary embodiment, motor control assembly 55 includes electronics enclosure 54, which houses control system 11. Control system 11 includes a power supply module 200 and an inverter module 210 that is physical separate from, but in electrical communication with power supply module 200.

Power supply module 200 includes an input connector 201 a plurality of electrical components 202, and an output connector 203 mounted on a component board, such as a printed circuit board (PCB) 204. Power supply module 200 integrates large through-hole electrical components and power connectors of control system 11. In the exemplary embodiment, PCB 204 is coupled to an interior surface of bottom wall 56 of electronics enclosure 54. Input connector 201 includes power input line connectors 205 for coupling to a power source. Input connector 201 interfaces with and receives input power from the power source via an opening in side wall 57 of electronics enclosure 54. In some known motor control assemblies, power is supplied via a system controller, such as an HVAC system controller.

Electrical components 202, including, for example, thermistors, electromagnetic interference (EMI) chokes, electrolytic capacitors, and rectifiers, of power supply module 200 are configured to convert input voltage received from the power source to a desired level of direct current (DC) voltage. Layout of electrical components 202 is typically challenging with respect to EMI performance. Using output connector 203, power supply module 200 outputs the converted DC voltage to inverter module 210. Output connector 203 includes two high-voltage wires 208 for providing the converted DC voltage to inverter module 210.

Inverter module 210 includes electrical components and an input/output connector configured to receive connector 211. Inverter module 210 further includes a heat-sharing package 212, including an insulated metal substrate 213 coupled to a metal heatsink 214 formed in side wall 57 of electronics enclosure 54. Heat-sharing package 212 includes a minimization of external connections. Included in connections to the external environment are the power connections. These power connections include the DC power from power supply module 200 and the three phase AC power to motor 10. To provide the desired minimization of connections, the signal connections are made via a wireless connection to the system controller.

Inverter module 210 includes power semiconductors mounted on heatsink 214 and other components generate heat as they switch power to the motor windings. Input/output connector 211 is coupled to high-voltage wires 208 for receiving the converted DC voltage from power supply module 200. Inverter module 210 converts the DC voltage to a three-phase alternating current (AC) voltage for driving electric motor 10 based in instructions received from an external device, for example, an HVAC system controller. Input/output connector 211 outputs the three-phase AC voltage to winding stages 44 of motor 10 via output power wires 215.

In alternative embodiments, power semiconductor switching devices may be embodied in, for example, and without limitation, an insulated-gate bipolar transistor (IGBT), a metal-oxide semiconductor field-effect transistor (MOSFET), a bipolar junction transistor (BJT), a gate turn-off (GTO) thyristor, an integrated gate-commutated thyristor (IGCT), a metal-oxide semiconductor (MOS) controlled transistor (MCT), or any other suitable thyristor, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

Figure 5:
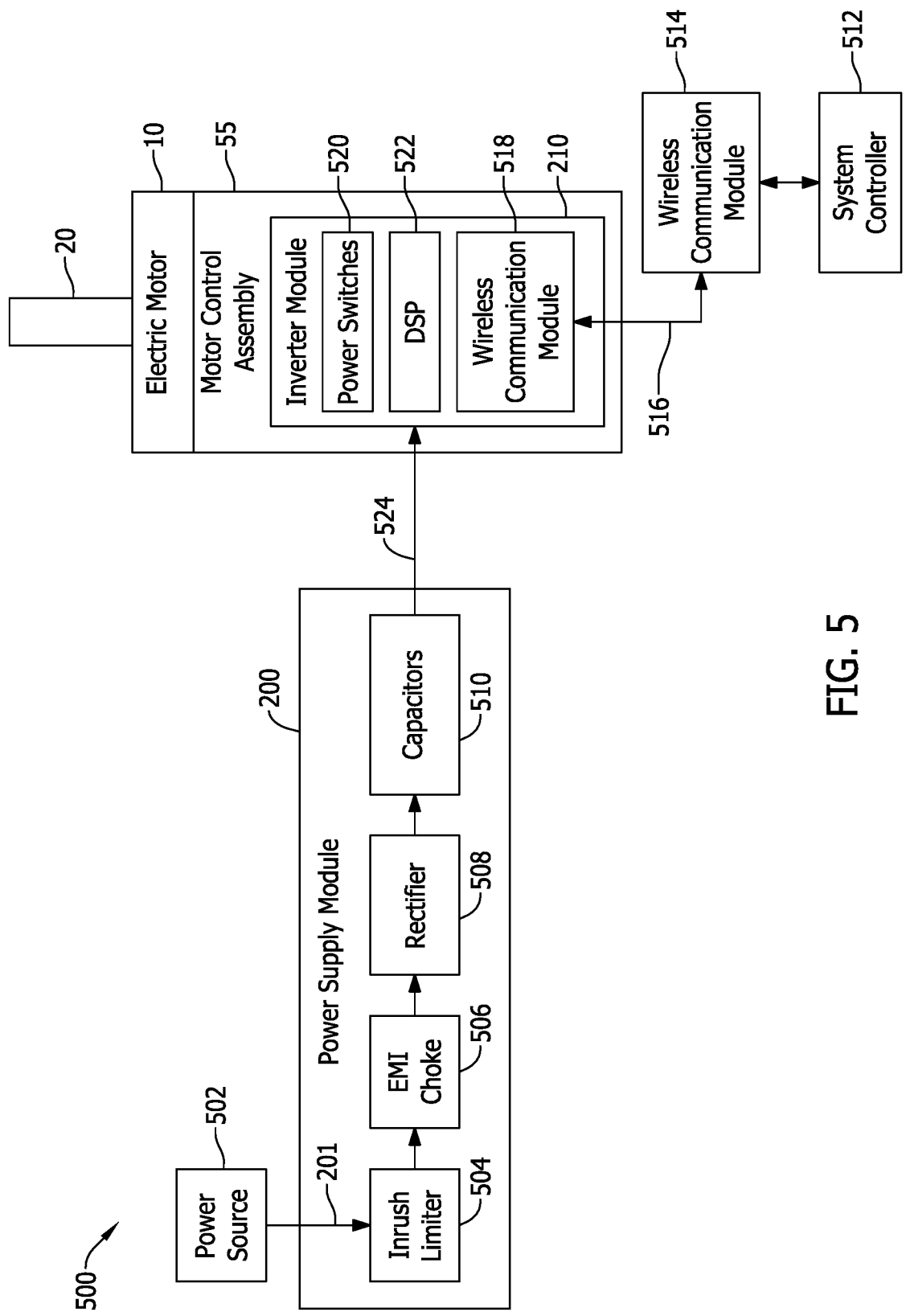
FIG. 5 is a block diagram of an exemplary motor control system for use with the electric motor shown in FIGS. 1-4.

FIG. 5 is a block diagram of an exemplary motor control system 500 configured to receive input power from an AC power source 502. Motor control system 500 includes power supply module 200 and inverter module 210. Power supply module 200 and inverter module 210 are modularly packaged, enabling the placement of power supply module 200 external to motor control assembly 55 and remote from inverter module 210. Motor control system 500 includes a system controller 512. System controller 512 communicates wirelessly with electric motor 10, or any other suitable device configured for wireless communication, through a wireless communication module 514 coupled to system controller 512. In certain embodiments, wireless communication module 514 is integrated within power supply module 200. Wireless communication module 514 communicates with inverter module 210 over a wireless communication channel 516 through a wireless communication module 518. For example, system controller 512 transmits a motor command signal to inverter module 210. More specifically, system controller 220 transmits a motor command signal via wireless communication module 514. Wireless communication module 518 of inverter module 210 receives the motor command signal and transmits the command to DSP 522, which operates power switches 520 to drive motor 10 in accordance with the motor command signal. In certain embodiments, wireless communication module 518 is further configured to receive sensor data or any other data related to operation of drive motor 10.

In one embodiment, motor 10 is used in a residential HVAC application, such as an air conditioner, a heat pump, and/or a furnace. System controller 512 is an OEM system controller with a thermostat. Wireless communication module 514 enables communications between the OEM system controller and the thermostat, and wireless communication module 518 of inverter module 210. A user selects a mode of operation on the OEM system controller (i.e., heating, cooling, or continuous fan). The thermostat measures and provides a temperature to the OEM system controller. Based on the selected mode of operation and the measured temperature, the OEM system controller transmits a motor command signal to motor 10.

In another embodiment, system controller 512 is an external programming device that includes wireless communication module 514. The external programming device is a mobile computing device such as a smartphone, a tablet, or a laptop computer, and enables a user such as an OEM or a technician to configure, program, collect diagnostic information from, and/or perform field commissioning on motor 10. Wireless communication module 514 enables communications between the external programming device and wireless communication module 518 of inverter module 210. The external programming device transmits motor command signals to motor 10. More specifically, in the exemplary embodiment, the external programming device transmits a motor command signal via wireless communication module 514. Wireless communication module 518 of inverter module 210 receives the motor command signal and operates power switches 520 to drive motor 10 in accordance with the motor command signal.

In some embodiments, inverter module 210 is configured to communicate with system controller 512 or other devices through a wired connection. For example, in some such embodiments, inverter module 210 is configured for one-wire communication with system controller 512. In such a configuration, a single wire coupled between inverter module 210 and system controller 512, in combination with a DC ground of inverter module 210, enables inverter module 210 to, for example, receive a control signal from system controller 512. In some embodiments, inverter module 210 is configured to communicate with system controller 512 via DC power lines that supply power to inverter module 210 at connector 524 using, for example, high frequency communication signals. For example, in some such embodiments, inverter module 210 is configured to receive a control signal from system controller 512 via connector 524. In some embodiments, inverter module 210 is configured to communicate with additional devices, such as other motor control systems. For example, an HVAC system may include a plurality of motor control systems 500 configured to communicate among one another.

In the exemplary embodiment, power supply module 200 is configured to receive AC power from power source 502 through connector 201. For example, in the exemplary embodiment, power source 502 is an AC utility that provides single-phase AC input voltage of 120V/240V/277V at 50/60 Hz.

In the exemplary embodiment, power supply module 200 includes electrical components 202, including, for example, an inrush limiter 504 for inrush current protection, an EMI choke 506 for reducing EMI, a rectifier 508 for converting AC voltage from power source 502 to DC voltage, and at least capacitor 510 to minimize voltage transients experienced during power switch operation. The resulting DC voltage is provided to inverter module 210 through a connector 524. Power supply module 200 generally includes passive components having low rates of failure.

In some embodiments, power supply module 200 is configured to supply power to inverter module 210 at multiple different voltages. For example, in some embodiments, power supply module 200 is configured to supply a high DC voltage for powering phases of motor 10 and a low DC voltage for powering control electronics of inverter module 210, such as wireless communication module 218 and a digital signal processor (DSP) 522. In some such embodiments, power supply module includes a low voltage supply that provides the low DC voltage. Alternatively, in some embodiments, the low voltage supply may be implemented in inverter module 210 or as a separate component. For example, the low voltage supply may be a battery or photovoltaic cell array. In such embodiments, the low voltage supply may be disposed within or external to motor control assembly 55.

Inverter module 210 is disposed within motor control assembly 55 of electric motor 10. Inverter module 210 includes wireless communication module 518, power switches 520, and DSP 522. Inverter module 210 receives DC voltage from power supply module 200 through connector 524. Power switches 520 switch the DC power to the motor phases converting the DC power to AC power. Power switches include, for example, IGBTs or other suitable semiconductor switches for switching DC power. DSP 522 is a microcontroller or other suitable processor for executing a control algorithm to operate power switches 520. Inverter module 210 generally includes active components having higher rates of failure relative to those of components of power supply module 200.

In some embodiments, inverter module 210 is configured to supply AC power to motor 10 in a three-phase configuration. Alternatively, inverter module 210 may supply AC power to motor 10 in a four-phase configuration or other configuration having any number of phases. In some embodiments, inverter module 210 is configured as a two-phase inverter, with power switches 520 that are arranged as H-bridges.

In certain embodiments, inverter module 210 also includes a plurality of sensors for providing data to DSP 522. The sensors are configured to measure various operating parameters associated with the operation of motor 10, including voltage measurements, current measurements, temperature measurements, vibration measurements, noise measurements, and/or any other known measurements associated with operating an electric motor or the operating environment. Such sensor data, or any other data, can be transmitted via a wireless signal between wireless communication modules 514 and 518.

In some embodiments, inverter module 210 is configured to store or collect sensor data, diagnostic data, or other data. In such embodiments, such data can be retrieved from inverter module 210 via wireless communication modules 514 and 518 or via another wireless or wired communication connection, such as those described herein.

Wireless communication modules 514 and 518 include a wireless communication device that communicates with one or more remote devices, such as external devices. In the exemplary embodiment, wireless communication module 518 converts a received wireless signal into a control signal that DSP 522 utilizes to control operation of electric motor 10. Wireless signals may include, but are not limited to, Bluetooth, Bluetooth low energy, near field communications (NFC), infrared, and/or any other known types of wireless signals. Using wireless communication to communicate with external devices enables elimination of hardwired communication connectors. Such hardwired connectors contribute to the size of motor control assembly 55, and their elimination enables a reduction in the size of motor control assembly 55. In the exemplary embodiment, DSP 522 includes at least one memory device and a processor that is communicatively coupled to the memory device for executing instructions. In some embodiments, executable instructions are stored in the memory device. In the exemplary embodiment, DSP 522 performs one or more operations described herein by programming the processor. For example, the processor may be programmed by encoding an operation as one or more executable instructions and by providing the executable instructions in the memory device.

DSP 522 may include one or more processing units (e.g., in a multi-core configuration). Further, DSP 522 may be implemented using one or more heterogeneous processor systems in which a main processor is present with secondary processors on a single chip. As another illustrative example, DSP 522 may be a symmetric multi-processor system containing multiple processors of the same type. Further, DSP 522 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In some embodiments, inverter module 210 is configured to execute one or more embedded software features, for example, using DSP 522. For example, in some embodiments, inverter module 210 utilizes software to operate motor 10 based on normalized (e.g., 0-100%) speed, torque, or airflow commands. Accordingly, inverter module 210 is able to accommodate multiple different power levels for operating motor 10 while providing a consistent user experience, for example, at system controller 512. Further, such software features enable inverter module 210 to communicate with system controllers 512 having various different OEMs.

Figure 6:
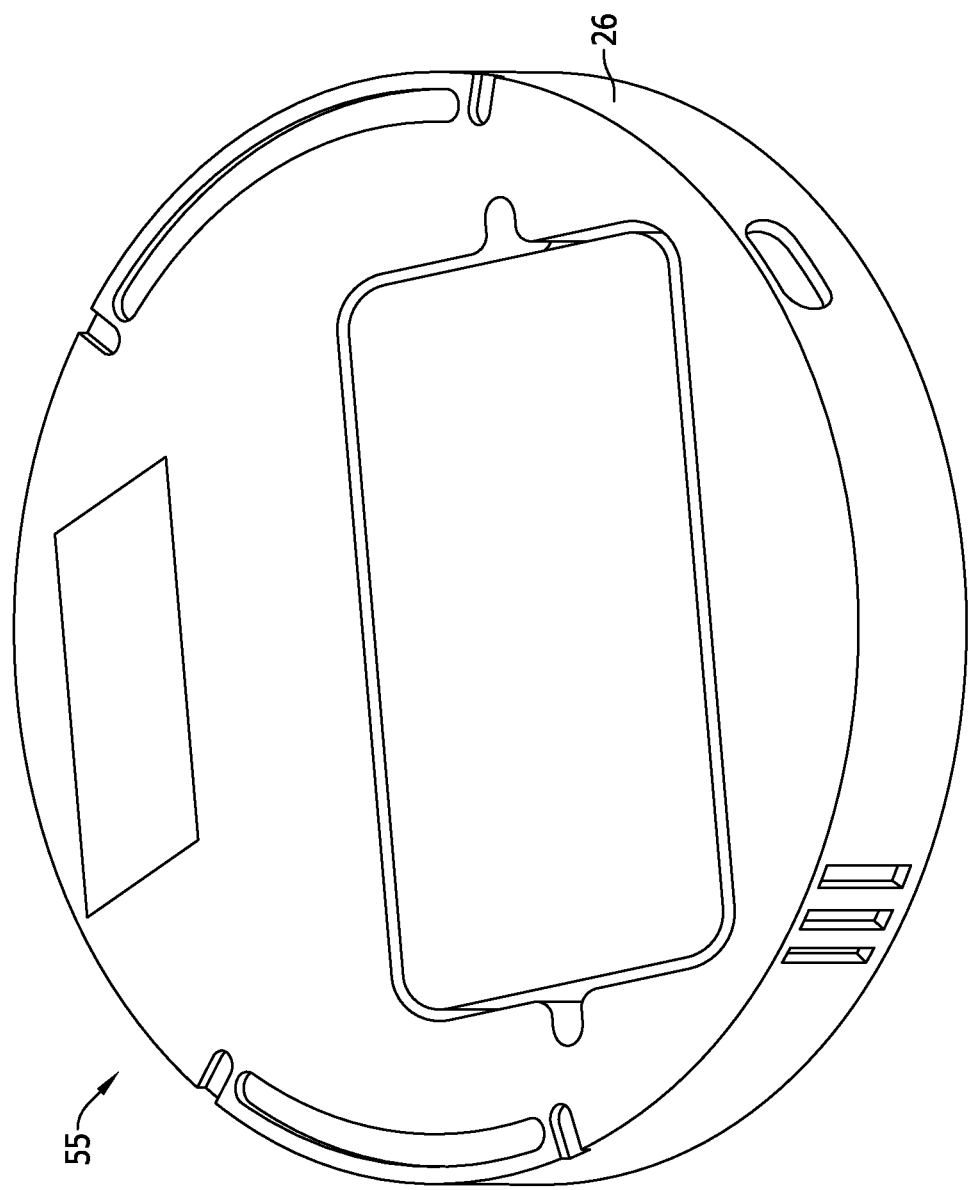
FIG. 6 is a perspective view of an exemplary motor control assembly for use in the motor control system shown in FIG. 5.

FIG. 6 is a perspective diagram of motor control assembly 55 shown in FIG. 5. Motor control assembly 55 is illustrated coupled to first end member 26, which is further coupled to casing 72, shown in FIG. 1. Motor control assembly 55 houses inverter module 210, including wireless communication module 518, power switches 520, DSP 522, and input power connector 524. Power supply module 200 is external to motor control assembly 55 and located remotely with respect to electric motor 10.

Figure 7:
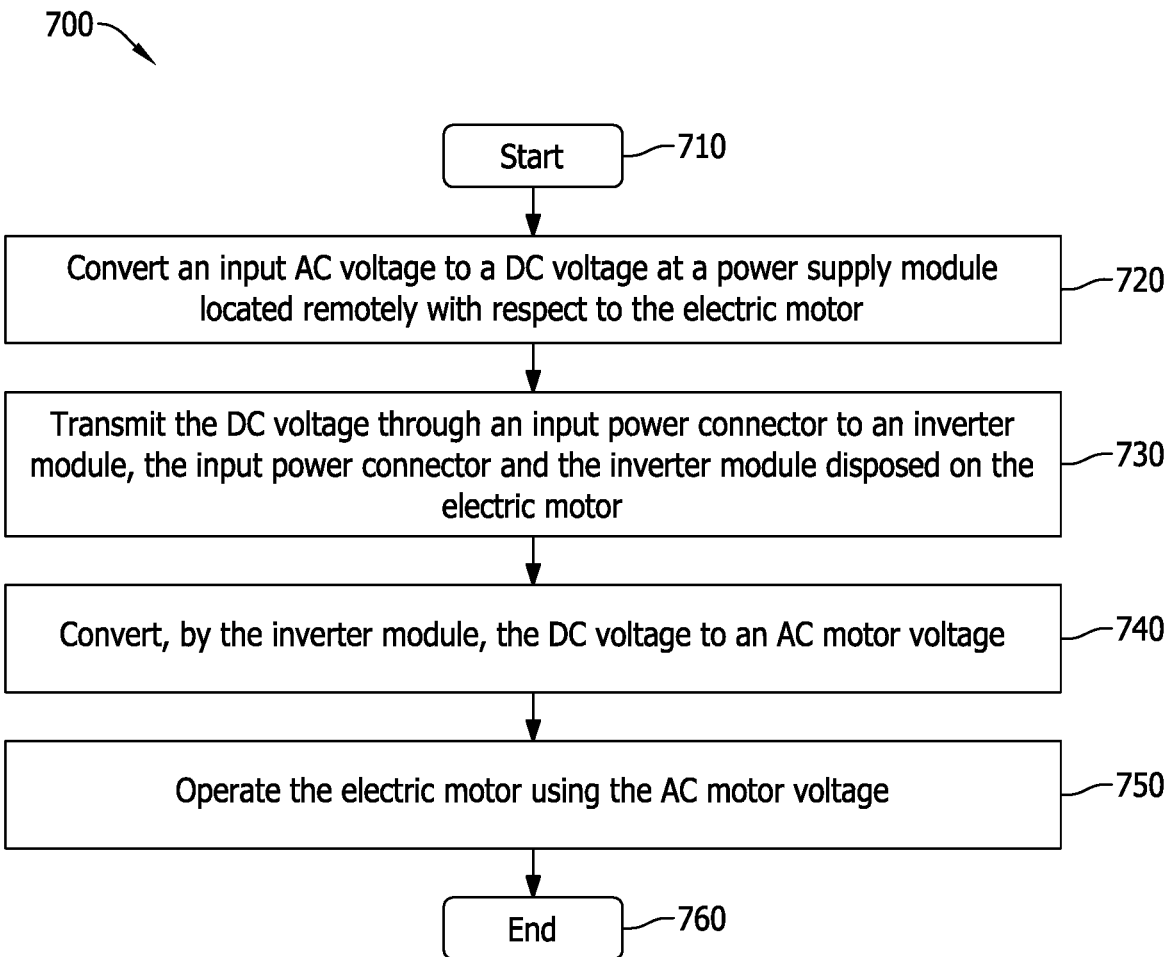
FIG. 7 is a flow diagram of an exemplary method of operating the electric motor shown in FIG. 5.

FIG. 7 is a flow diagram of an exemplary method 700 of operating electric motor 10 for an HVAC appliance. Method 700 begins at a start step 710. At a rectification step 720, an input AC voltage is received at power supply module 200 and converted to a DC voltage. Power supply module 200 is located remotely with respect to electric motor 10. More specifically, power supply module 200 is not a component of motor control assembly 55, and not located within electronics enclosure 54. Power supply module 200 converts the input AC voltage to the DC voltage using mostly passive components having low rates of failure.

At a transmission step 730, the DC voltage generated by power supply module 200 is transmitted to electric motor 10. The DC voltage is received at motor control assembly 55 via input power connector 524, which delivers the DC voltage to inverter module 210. Inverter module 210 is disposed within motor control assembly 55, which is further coupled to electric motor 10.

At an conversion step 740, inverter module 210 converts the DC voltage to an AC motor voltage. In certain embodiments, inverter module 210 includes DSP 522 that controls power switches 520 to convert the DC voltage to the AC motor voltage. Electric motor 10 is operated using the AC motor voltage at an operation step 750.

In certain embodiments, method 700 further includes system controller 512 transmitting a wireless signal to electric motor 10 through wireless communication module 514. The wireless signal is received at inverter module 210 via wireless communication module 518. Wireless communication modules 514 and 518 establish a wireless channel 516 for bidirectional communication. For example, the wireless signal is instructive to operate electric motor 10. DSP 522, in certain embodiments, receives the wireless signal from wireless communication module 518 and controls power switches 520 according to the wireless signal. The resulting AC motor voltage is then used to operate electric motor 10. The method terminates at an end step 760.

In the exemplary embodiment, the memory device is one or more devices that enable information such as executable instructions and/or other data to be stored and retrieved. The memory device may include one or more computer readable media, such as, without limitation, an NFC electrically erasable programmable read-only memory (EEPROM), a standard EEPROM, dynamic random access memory (DRAM), static random access memory (SRAM), a solid state disk, and/or a hard disk. The memory device may be configured to store, without limitation, application source code, application object code, source code portions of interest, object code portions of interest, configuration data, execution events and/or any other type of data. In the exemplary embodiment, the memory device includes firmware and/or initial motor configuration data for DSP 522. Moreover, in the exemplary embodiment, the memory device stores diagnostic data associated with operation of motor 10, for transmission to one or more external devices upon request. Diagnostic data includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

Embodiments of the electric motors and electric motor control systems described herein provide a modular-packaged control system for HVAC appliances. More specifically, the modular-packaged control system separates the control system into two discrete housings. One housing includes an inverter module and a second housing includes a power supply module that serves as a front-end to the electric motor. The power supply module generally includes passive components with relatively low failure rates. The passive components convert and condition AC power from a power source to DC power to operate the electric motor. The power supply module, in certain embodiments, may further include a system controller and wireless communication module, e.g., a radio, for controlling the electric motor remotely. The first housing, which contains the inverter module, includes active components, such as, for example, power switches, one or more processors or DSPs, and a wireless communication module, e.g., a radio. The components of the inverter module typically fail at a higher rate than the components of the power supply module. Modular packaging of the inverter module and power supply module enable replacement of the modules separately. The inverter module and its housing are located on the electric motor within a motor control assembly. The power supply module may be located within the HVAC appliance, but remote from the electric motor itself, thus reducing the motor control assembly's impedance of airflow. Moreover, the wireless communication module of the inverter module enables remote control of the inverter module and the electric motor via the wireless communication module of the system controller, and further enables the DC power connections among the power supply module, the motor control assembly, and the inverter module.

The technical effects of the electric motors and electric motor control systems described herein include, for example, and without limitation: (a) reducing wired connections for control and I/O among components of the motor control system; (b) utilizing wireless communication between a system controller and the electric motor; (c) physically separating the power supply module from the electric motor; (d) reducing the size of the motor control assembly on the electric motor through physical separation of the power supply module from the inverter module; (e) enabling wired connections between the power supply module and the motor control assembly through elimination of control and I/O connections; (f) reducing the airflow impedance created by the motor control assembly through the reduction in size of the motor control assembly and removal of bulky components from the airflow path; (g) improving efficiency of the system through reduced airflow impedance; (h) reducing cost of operation and maintenance of the electric motor through improved efficiency; (i) packaging motor control components together based on average failure rates; (j) reducing unnecessary component replacement through separate replacement of the power supply module and the inverter module; (k) reducing maintenance costs for the electric motor through reduced replacement components; (l) improving EMI and thermal performance of the electric motor through physical separation of the power supply module from the electric motor; and (m) improving power density of power supply module.

Some embodiments described herein relate to electric motors including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any motor, and are not limited to practice with the electric motors as described herein. In addition, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

What is claimed is:

1. An electric motor control assembly configured to be coupled to an electric motor, said electric motor control assembly comprising:
   an input power connector configured to receive a direct current (DC) voltage from a power supply module external to the electric motor control assembly, wherein the power supply module includes an electromagnetic interference (EMI) choke, a rectifier, and a capacitor; and
   an inverter module coupled to said input power connector, said inverter module configured to convert the DC voltage to an alternating current (AC) voltage to operate the electric motor according to a control signal, said inverter module configured to receive the control signal from a system controller via at least one of said input power connector or a wireless communication module coupled to said inverter module and configured for wireless communication with the system controller.

2. The electric motor control assembly of claim 1, wherein said inverter module comprises a digital signal processor (DSP) and a plurality of power switches, said DSP configured to control said plurality of power switches to generate the AC voltage to power the electric motor.

3. The electric motor control assembly of claim 2, wherein said plurality of power switches comprises a plurality of insulated-gate bipolar transistors (IGBTs).

4. The electric motor control assembly of claim 1, wherein said inverter module is further configured to receive a rectified power signal through said input power connector.

5. The electric motor control assembly of claim 1, wherein said inverter module comprises a digital signal processor (DSP) coupled to said input power connector, said DSP configured to receive the control signal, the control signal instructive to operate the electric motor.

6. The electric motor control assembly of claim 1 further comprising a housing, wherein said inverter module is disposed within said housing.

7. The electric motor control assembly of claim 6, wherein said input power connector is further coupled to said housing.

8. A heating, ventilation, and air conditioning (HVAC) appliance, comprising:
   a power supply module configured to convert an input alternating current (AC) voltage to a direct current (DC) voltage;
   an electric motor configured to turn a fan to generate an airflow through said HVAC appliance; and
   a motor control assembly coupled to said electric motor, said motor control assembly comprising:
      an input power connector configured to receive the DC voltage from said power supply module; and an inverter module coupled to said input power connector, said inverter module configured to convert the DC voltage to an AC motor voltage to operate the electric motor according to a control signal and further configured to receive the control signal from a system controller via at least one of said input power connector or a wireless communication module coupled to said inverter module and configured for wireless communication with the system controller.

9. The HVAC appliance of claim 8, wherein said power supply module is located remotely with respect to said electric motor.

10. The HVAC appliance of claim 9, wherein said power supply module further comprises a wireless communication module.

11. The HVAC appliance of claim 8 further comprising the system controller, said system controller configured to transmit the control signal to said inverter module.

12. The HVAC appliance of claim 11, wherein said system controller is further configured to receive diagnostic data from said inverter module.

13. The HVAC appliance of claim 11, wherein said system controller further comprises said power supply module.

14. The HVAC appliance of claim 8, wherein said power supply module introduces zero airflow impedance on the fan.

15. The HVAC appliance of claim 8 further comprising an enclosure within which said power supply module, said electric motor, and said motor control assembly are disposed, said enclosure comprising a plenum space through which the airflow moves, and wherein said power supply module is disposed in said plenum space.

16. A method of operating an electric motor for a heating, ventilation, and air conditioning (HVAC) appliance, said method comprising:

converting an input alternating current (AC) voltage to a direct current (DC) voltage at a power supply module located remotely with respect to an electric motor control assembly coupled to the electric motor, wherein the power supply module includes an electromagnetic interference (EMI) choke, a rectifier, and a capacitor;

transmitting the DC voltage through an input power connector to an inverter module within the electric motor control assembly, the input power connector and the inverter module disposed on the electric motor;

receiving, by the inverter module, a control signal from a system controller via at least one of the input power connector or a wireless communication module coupled to the inverter module and configured for wireless communication with the system controller;

converting, by the inverter module, the DC voltage to an AC motor voltage according to the control signal; and operating the electric motor using the AC motor voltage.

17. The method of claim 16 further comprising:

receiving a wireless signal through the wireless communication module coupled to the inverter module; and converting the DC voltage to the AC motor voltage according to the wireless signal.

18. The method of claim 17, wherein operating the electric motor comprises operating the electric motor according to the wireless signal.

19. The method of claim 16 further comprising transmitting, from a system controller, the control signal to the inverter module, the control signal instructive to operate the electric motor.

20. The method of claim 16, wherein converting the DC voltage to the AC motor voltage comprises controlling, by a digital signal processor (DSP), a plurality of power switches to generate a three-phase AC motor voltage.

* * * * *